(12) United States Patent
Guntermann et al.

(10) Patent No.: US 11,125,240 B2
(45) Date of Patent: Sep. 21, 2021

(54) DEVICE FOR DRIVING A COMPRESSOR

(71) Applicant: Hanon Systems, Daejeon (KR)

(72) Inventors: Bernd Guntermann, Lennestadt (DE); David Walisko, Hürth (DE); Stephan Heinrichs, Hürtgenwald (DE)

(73) Assignee: Hanon Systems, Daejeon (KR)

( * ) Notice: Subject to any disclaimer, the term of this patent is extended or adjusted under 35 U.S.C. 154(b) by 256 days.

(21) Appl. No.: 16/381,764

(22) Filed: Apr. 11, 2019

(65) Prior Publication Data

US 2019/0331120 A1 Oct. 31, 2019

(30) Foreign Application Priority Data

Apr. 26, 2018 (DE) .......................... 102018110045.0
Mar. 25, 2019 (DE) .......................... 102019107509.2

(51) Int. Cl.
| | |
|---|---|
| *F04D 25/06* | (2006.01) |
| *F04B 17/03* | (2006.01) |
| *H02K 5/22* | (2006.01) |
| *F01C 21/00* | (2006.01) |
| *F04C 23/02* | (2006.01) |

(52) U.S. Cl.
CPC ........ *F04D 25/0606* (2013.01); *F01C 21/007* (2013.01); *F04B 17/03* (2013.01); *F04C 23/02* (2013.01); *H02K 5/225* (2013.01)

(58) Field of Classification Search
CPC ............ H02K 5/225; H02K 5/02; H02K 5/08; H02K 5/12; H02K 5/04; H02K 11/0094; H02K 11/33; F04B 17/03; F04B 35/04; F04B 39/121; F04C 18/0215; F04C 2240/803; F04C 2240/808; F04C 29/0085; F04C 23/02; F04C 2240/40; F04C 2210/26; F04D 25/0606; F01C 21/007
See application file for complete search history.

(56) References Cited

U.S. PATENT DOCUMENTS

| 2015/0263581 A1* | 9/2015 | Yamamoto | ............... H02K 5/02 310/43 |
|---|---|---|---|
| 2017/0040864 A1* | 2/2017 | Takabe | .................... F04B 35/04 |
| 2018/0351428 A1* | 12/2018 | Okamoto | ............... H02K 1/146 |

FOREIGN PATENT DOCUMENTS

| JP | H0564410 A | 3/1993 |
|---|---|---|
| JP | 2008069672 A | 3/2008 |
| KR | 20180023166 A | 3/2018 |
| WO | 2015146677 A1 | 10/2015 |

* cited by examiner

*Primary Examiner* — Dominick L Plakkoottam
(74) *Attorney, Agent, or Firm* — Norton Rose Fulbright US LLP; James R. Crawford (57) ABSTRACT

A device for driving a compressor of a gaseous fluid, in particular an electric motor. The device comprises a rotor and a stator which are disposed extending along a common longitudinal axis. A carrier element is disposed in contact on a first end side, oriented in an axial direction, of the stator, which carrier element is developed as a coherent unit and integral component with at least one receiving element for a connector for receiving at least one plug connector. In the axial direction the carrier element is in contact with a cylindrical wall on an insulation element fixedly connected with the stator and comprises an axially oriented annular surface.

18 Claims, 4 Drawing Sheets

DEVICE FOR DRIVING A COMPRESSOR

This application claims priority from German Patent Application Nos. 102018110045.0 filed on Apr. 26, 2018 and 102019107509.2 filed on Mar. 25, 2019. The entire contents of these applications are incorporated herein by reference in their entirety.

FIELD OF THE INVENTION

The invention relates to a device for driving a compressor, in particular an electric motor, for the compression of a gaseous fluid, specifically of a refrigerant. The compressor can be employed in the refrigerant circuit of a climate control system of a motor vehicle. The device comprises a rotor and a stator disposed extending along a common longitudinal axis.

BACKGROUND OF THE INVENTION

Compressors known in prior art for mobile applications, in particular for climate control systems of motor vehicles, for the conveyance of refrigerant through a refrigerant circuit, also termed refrigerant compressors, are often developed, independently of the refrigerant, as piston compressors with variable stroke displacement or as scroll compressors. The compressors herein are driven either electrically or by a belt pulley.

Apart from the electric motor for driving the particular compressor mechanism, an electrically driven compressor comprises an inverter for driving the electric motor. The inverter serves for converting direct current from a motor vehicle battery into alternating current which is supplied to the electric motor across electric lines.

Conventional electric motors of electrically driven compressors are implemented with an annular stator core with coils disposed thereon and a rotor, wherein the rotor is disposed within the stator core. Rotor and stator are oriented on a common axis of symmetry or rotational axis of the rotor.

The inverter comprises plug connections for the electric connection with connections of the electric motor, which, in turn, are electrically connected with the coils of the stator. The connections of the electric motor are developed in a connector housing disposed on an end side of the stator oriented in an axial direction of the stator.

In prior art electric motors of electrically driven compressors a connector housing is secured by pressing it onto the stator insulation. The connector housing is fixed in position during the assembly. During operation of the compressor, and thus of the electric motor, the press fit generated during the assembly between the connector housing and the stator insulation can become detached so that the connector housing moves and oscillates relative to the surrounding, in particular relative to the stator insulation, which causes material abrasion on the faces that are disposed in contact on one another.

During the assembly of an electric motor in a compressor the connection cables, secured on terminal clamps and bending on the stator core, of the conducting wires of the coils can generate a circular tangential force acting outwardly in the radial direction, which can lead to a displacement of the connector housing. Furthermore, the connector housing can be placed in different dispositions relative to the stator although only one specific disposition results in the connection lines of the conducting cables being correctly introduced into connector ports of the connector housing. In the process of assembly an incorrect disposition of the connector housing leads to greater time expenditures for changing and newly positioning the connector housing.

Consequently, for assembling the stator in the motor housing it is mandatory to fix the connector housing in a predetermined specific position on the stator in order for the plug connectors that are disposed on the inverter and implemented as pins, to engage into the connector ports provided in the connector housing.

WO 2015/146677 A1 discloses an electrically driven compressor with a compression arrangement, an electric motor for driving the compression arrangement and an inverter for supplying the electric motor with voltage. The electric motor comprises a rotor and a stator with an electrically insulating coil body disposed at an end of a stator core, coils disposed on the coil body and a connector housing with connector ports for the electric connection of the coils with the inverter. The connector housing is mechanically connected at the coil body end side with the stator using snap-in means or a spring closure, in particular across snap-in hooks. As electrical connections of the conducting wires of the coils, connecting cables must always be connected before the connector housing is secured on the coil body.

OBJECTS OF THE INVENTION

The invention addresses the problem of providing and improving a device for driving an electrically driven compressor of a gaseous fluid, in particular of an electric motor, which can be assembled simply and therewith time-savingly. In particular the connector housing shall be fixable on the stator in a predefined position and a relative movement of the connector housing with the connector ports, implemented in the connector housing for receiving plug-in connectors of the inverter, with respect to the stator, specifically also rotational displacements about the longitudinal axis of the stator during the assembly of the device, is to be prevented. The device shall have the lowest possible number of individual components and structural elements as well as be constructionally simple of realization in order to minimize additionally also the costs of production.

SUMMARY OF THE INVENTION

The problem is resolved through the subject matters with the characteristics of the independent patent claims. Further developments are specified in the dependent claims.

The problem is resolved through a device according to the invention for driving a compressor of a gaseous fluid, in particular an electric motor. The device comprises a rotor and a stationary stator which extend along a common longitudinal axis.

The stator is advantageously positioned in the radial direction on an outer side of the rotor and encompasses the rotor.

According to the concept of the invention, on a first end side, oriented in an axial direction, of the stator, a carrier element is disposed in contact. With at least one receiving element for a connector housing for receiving at least one plug-in connector, the carrier element is structured as a coherent unit and unitary component such that the receiving element is an integral part of the carrier element. The carrier element is furthermore disposed in the axial direction in contact on an insulation element, fixedly connected with the stator, with a cylindrical, in particular hollow-cylindrical wall and comprises an axially oriented annular surface.

The at least one receiving element is advantageously developed with at least one connection passage which corresponds with a connector port of the connector housing for receiving plug-in connectors of electrical connections.

By axial direction is herein understood the direction of the longitudinal axis of the stator, which also corresponds to the longitudinal axis and the rotational axis of the rotor. An end side oriented in the axial direction is disposed in a plane oriented perpendicularly to the longitudinal axis. As a fixed connection of the insulation element with the stator is to be viewed a connection in which the disconnection of the components results solely from the destruction of at least one of the components.

According to a further development of the invention, the insulation element is disposed in a radial direction internally in contact on an outer wall of a stator core. The wall of the insulation element is herein developed as a region projecting from the stator core in the axial direction.

According to a preferred embodiment of the invention, the carrier element is developed next to the axially oriented annular surface with a radially oriented annular surface, which are disposed adjoining one another at outer side edges and are connected with one another. The receiving element for the connector housing is preferably developed as a subregion of the radially oriented annular surface of the carrier element.

The radially oriented annular surface of the carrier element advantageously has the form of a circular ring, in particular of a sector of a circular annulus or of an open circular annulus, while the axially oriented annular surface of the carrier element is developed in the form of a cylinder, specifically in the form of a circular cylinder, specifically in the form of a hollow circular cylinder. The outer diameter of the wall of the region of the insulation element projecting from the stator core preferably corresponds substantially to an inner diameter of the carrier element in the region of the axially oriented hollow cylinder-form annular surface plus a gap or tolerance for assembling the components.

According to an advantageous embodiment of the invention, the device comprises a locking system for the protection against movements, or a rotation lock system, of the carrier element in a circumferential direction of the stator with at least one first element and at least one second element, which together form a connection under form closure. By form-closure connection is here to be understood that the connection elements at least regionally are of a form corresponding to one another, which are not necessarily in contact with one another. The first element and the second element preferably comprise each a form developed symmetrically to the longitudinal axis.

The first element of the rotation lock system for the protection against rotation of the carrier element is herein preferably developed in a circumferential direction of the stator on the insulation element and the second element is preferably developed on the carrier element. The second element of the system is provided in particular on an inner side of the axially oriented annular surface of the carrier element, while the first element of the system is developed as a recess which, starting at an end side of the wall of the insulation element, extends parallel to the longitudinal axis of the stator into the wall of the insulation element.

The rotation lock system for protecting the carrier element against rotation in a circumferential direction of the stator consequently serves specifically as a rotation protection arrangement for the connector ports of the connector housing on the insulation element of the stator. The correct and concentric positioning of the carrier element in relation to the receiving element for the connector housing herein prevents undesirable relative movements of the connector housing in the radial and circular-tangential direction during the entire assembly process and during the operation of the device.

A further advantage of the invention comprises that the first element of the rotation lock system for the protection of the carrier element against rotation is developed in a circumferential direction of the stator as a notch with a semicircular base and connection edges. The connection edges extending between the base of the notch and the end side of the wall of the insulation element, starting from the end side of the wall of the insulation element, are oriented so as to taper toward one another.

The second element of the system is preferably developed as a formation which corresponds to the form of the first element of the system. The second element of the system is herein provided in particular as a formation projecting from an inner side of the axially oriented annular surface of the carrier element developed with a form tapering in the direction of the longitudinal axis of the stator and having the form of a semicircle at the tapered end. The second element of the system is preferably disposed at a transition of the axially oriented annular surface to the radially oriented annular surface of the carrier element.

With the implementation of at least two first elements and two second elements of the rotation lock system for protecting the carrier element against rotation in a circumferential direction of the stator, the particular corresponding elements are advantageously distributed nonuniformly over the circumference of the axially oriented annular surface of the carrier element. The elements are herein oriented asymmetrically, at an unequal spacing on the circumference or are each oriented at a different angle with respect to one another.

According to a further preferred embodiment of the invention, on the inner side of the axially oriented annular surface of the carrier element at least one projection is implemented in the form of a fin which is preferably disposed extending in the direction of the longitudinal axis of the stator. In particular an upper side of the projection oriented toward the insulation element for generating a press fit is disposed in contact on an outer side of the wall projecting from the stator core of the insulation element.

With an implementation of at least two projections, the projections are advantageously disposed uniformly distributed over the circumference of the axially oriented annular surface of the carrier element in order to center the carrier elements in particular with respect to the stator and the longitudinal axis.

According to a further development of the invention, the carrier element comprises at least one resiliently deformable pressure element with a contact region. The pressure element is developed substantially such that it extends at an extent in the axial direction. In an assembled state of the device the pressure element is in contact under resilient deformation with the contact region on a mating face. The contact region of the pressure element can be developed, for example, as a contact area, a contact edge or also be punctiform.

Due to the pressure applied through the resilient deformation of the pressure element onto the carrier element, the carrier element with the receiving element with the connection passages for the connector housing with the connector ports is pressed against the stator and in this way a protection against undesirable relative movements of the carrier element with respect to the stator is ensured.

A further advantage of the invention lies therein that the carrier element with the receiving element and the at least one pressure element are developed as a coherent unit and integral component, such that, in addition to the receiving element, the pressure element is also a constituent part of the carrier element. The carrier element is therewith developed as a multifunctional component, in particular of the stator. The pressure element and the receiving element for the disposition of the connector housing with connector ports are disposed on a common side oriented in the axial direction of the carrier element.

According to a further advantageous embodiment of the invention, in an implementation of the carrier element with a multiplicity of pressure elements, the pressure elements are disposed distributed over a circumference on the carrier element. By multiplicity is to be understood at least two pressure elements.

The advantageous embodiment of the invention permits the use of the device for driving a compressor, in particular of an electric motor, for the compression of a gaseous fluid for a compressor of a refrigerant in a refrigerant circuit of a motor vehicle climate control system.

In summary, the device according to the invention for driving a compressor of a gaseous fluid with a minimal number of required components comprises further diverse and manifold advantages:
- fixing the carrier element with the at least one receiving element for a connector housing with the at least one connector port in position on the stator, thereby
- definitive and unambiguous positioning of the connector housing with the connector ports as a consequence of the definitive positioning of the carrier element with the receiving element for the connector housing before the assembly into the motor housing,
- the connector housing, disposed in the receiving element of the carrier element developed as a multifunctional component of the stator, as a component of the stator is not in contact on the insulation element of the stator or on the stator core, while the carrier element is in contact on the stator core and can be in contact on the insulation element,
- prevention of relative movements of the carrier element with the receiving element, and therewith of the connector housing with the connector ports for receiving plug-in connectors of the inverter, with respect to the stator, in particular rotation about the longitudinal axis of the stator during the assembly of the device, and therewith
- simple assembly of the device, in particular during the placement of the stator with the rotor into the motor housing, thereby reduction of the production of deficient products and of reworking and postprocessing.

Further details, characteristics and advantages of embodiments of the invention will become evident based on the following description of embodiment examples with reference to the associated drawing.

DETAILED DESCRIPTION

Figure 1A:
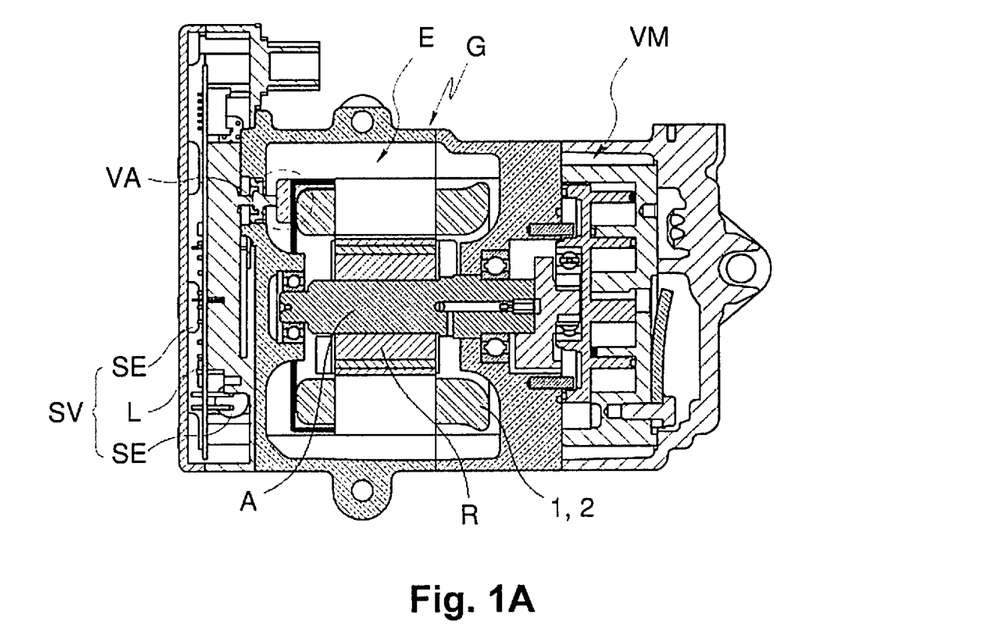
FIG. 1A: an electrically driven compressor with an electric motor as a device for driving a compressor mechanism in sectional representation.

FIG. 1A shows in sectional representation an electrically driven compressor with an electric motor E disposed in a housing G as a device for driving a compressor mechanism VM. The electric motor E is supplied with energy across a switching means SV.

The electric motor E comprises a stator 1 with a substantially hollow cylindrical stator core 2 and coils wound onto the stator core 2 as well as a rotor R disposed within the stator 1. The rotor R is set into rotational motion when the coils of the stator 1 are supplied with electrical energy across a connection arrangement VA. The connection arrangement VA is developed on an end side of the stator 1 and comprises a multiplicity of electrical connections.

The rotor R is disposed coaxially within the stator 1 and rotatably about a rotational axis. A driving shaft A can be implemented integrally with the rotor R or as a separate element.

The electric motor E as well as the compression mechanism VM, developed as a scroll compressor with a stationary and an orbiting spiral, are disposed within a volume enclosed by housing G. The housing G is herein developed of a first housing element for receiving the electric motor E and of a second housing element for receiving the compression mechanism VM. Housing G is preferably implemented of a metal, in particular of an aluminum material.

The orbiting spiral of the compression mechanism VM in which the gaseous fluid, specifically a refrigerant, is compressed, is driven across the drive shaft A connected with the rotor R of the electric motor E. According to an implementation, not shown, the compression mechanism can also be developed with a swashplate.

The switching arrangement SV for controlling the operation of the electric motor E comprises a circuit board L equipped with various switching elements SE. Mounted on the circuit board L are different electrically interconnected control circuits and components that are supplied with electric energy from a power line of an external power source.

Figure 1B:
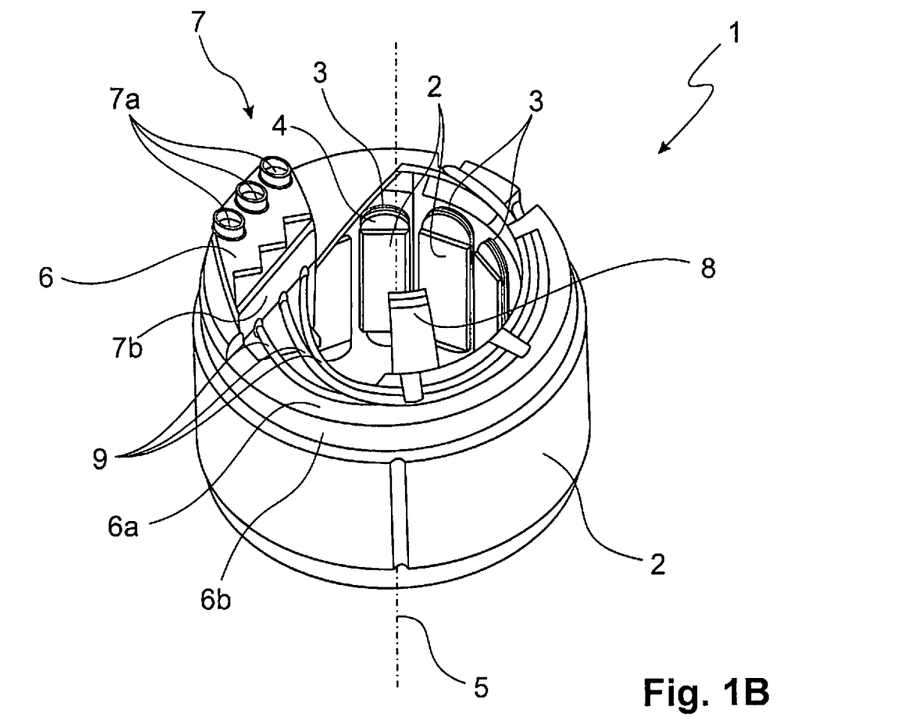
FIG. 1B: a stator of an electric motor as a device for driving a compressor of a gaseous fluid, with a stator core, coils, an insulation element and a carrier element with a receiving element for a connector housing in perspective view, FIG. 2 a detail view of an end side of the stator of FIG. 1B without carrier element, with a first element of a system for rotation protection.

FIG. 1B depicts in perspective view the stator 1 of the electric motor as a device for driving a compressor of a gaseous fluid, specifically for a climate control system of a motor vehicle, for conveying refrigerant through a refrigerant circuit. The stator 1 is developed with the stator core 2, coils 3, an insulation element 4 as well as a carrier element 6 with a receiving element 7 for a connector housing 7b as components of the connection arrangement VA.

The electric motor, for example a 3-phase alternating current motor, comprises the rotor, not shown, and the stator core 2 disposed in the radial direction on an outer side of the rotor and therewith disposed about the rotor. Both, the stator core 2, preferably developed as a laminated sheet package, and the insulation element 4, developed of an electrically insulating material, extend along a longitudinal axis 5 that also corresponds to the longitudinal axis of stator 1 and the rotational axis of the rotor, from a first end side to a second end side of stator 1. The insulation element 4 is advantageously developed as an extrusion coating of the stator core 2 and thus forms an integral component.

The coils 3 are developed of a wire, also termed conducting wire 9, wound about a region of the stator core 2 that extends inwardly in the radial direction. The non-wound ends of the conducting wires 9 are brought out of the particular winding as connection lines. The regions, extending inwardly in the radial direction, of stator core 2 have the form of a web and are positioned with uniform distribution over the circumference of an outer wall of stator core 2. Between the wires of coils 3 and the particular region of stator core 2 the insulation element 4 is disposed which insulates the stator core 2 and the wires of coils 3 with respect to one another. The insulation element 4 is developed at the ends, oriented inwardly and in the axial direction, of the webs so as to be expanded in the axial direction. The end segments projecting thusly of the insulation element 4 serve for fixing the wires, wound about the webs of stator core 2, of coils 3. The stator core 2, the insulation element 4 and the coils 3 form the stator unit of the electric motor.

The insulation element 4 projects at the end sides of stator 1 beyond the stator core 2. At the first end side of stator 1 a carrier element 6 is disposed with a receiving element 7 with connection passages 7a for a connector housing 7b with connector ports. The connector ports of the connector housing 7b serve as a component of an electrical connection between coils 3 of the electric motor and the inverter, for example with the aid of electrically conducting, pin-form connection elements which, fed through the connection passages 7a of the receiving element 7 of carrier element 6, are plugged into the connector ports of the connector housing 7b.

The conducting wires 9 of coils 3 and the connector ports of the connector housing 7b disposed in the receiving element 7 are electrically connected with one another across connection cables, also termed phase conductors.

In the mounted state of stator 1 the carrier element 6 is in contact, on the one hand, in the axial direction in particular on the stator core 2. The outer diameter of the carrier element 6 is less than the outer diameter of stator core 2.

The carrier element 6 with the receiving element 7 for the connector housing 7b with the connector ports furthermore, on the other hand, comprises a resilient pressure element 8 substantially extending in the axial direction. The receiving element 7 and the pressure element 8 are disposed on a common side, oriented in the axial direction and facing away from stator core 2, of the carrier element 6.

Carrier element 6 comprises furthermore a radially oriented circular ring-shaped annular surface 6a, in particular a sector of a circular ring-shaped annular surface, as well as an axially oriented cylinder-shaped, in particular hollow cylinder-shaped annular surface 6b, which adjoin one another at the outer side edges and thus are connected with one another. The receiving element 7 for the connector housing 7b is developed as a subregion of the radially oriented annular surface 6a and therewith is a constituent of the carrier element 6.

The hollow cylindrical wall of the axially oriented annular surface 6b of the carrier element 6 is developed with an outer diameter smaller than the outer diameter of the outer wall of stator core 2, and with an inner diameter greater than the inner diameter of the outer wall of stator core 2.

The resilient pressure element 8 is disposed in a region, in particular of an inner side edge, of the radially oriented circular ring-form annular surface 6a and preferably has the form of an arc or a spring. The pressure element 8, like the receiving element 7 for the connector housing 7b, is developed as a constituent of the carrier element 6. The carrier element 6 with the radial annular surface 6a, the axial annular surface 6b, the receiving element 7 with the connection passages 7a for the connector housing 7b with the connector ports and the pressure element 8, is developed as a unit, in particular as an integral injection-molded element. The implementation as a single unit is realized within a molding process.

The pressure element 8 comprises a web substantially oriented in the axial direction and a contact region substantially oriented in the radial direction. The pressure element 8 is herein connected with the radial annular surface 6a via a front edge of the web. At an end, distal to the front edge of the web, the pressure element 8 comprises the contact region advantageously developed as a contact area. In the mounted state of the electric motor, the pressure element 8 is in contact with the contact area on a housing, not shown, of the electric motor. When installing the stator 1 with the carrier element 6 within the motor housing, which means specifically during the shrinking or pressing of the stator 1 into the motor housing and the pressure applied therein of the motor housing onto the pressure element 8, particularly the web of the pressure element 8 is resiliently deformed.

As a component of the carrier element 6, the pressure element 8 has a defined rigidity corresponding to the geometry and the mechanical dimensions of the carrier element 6. When mounting the stator 1 in the motor housing, between the carrier element 6 and a surface area developed as a closed end of the motor housing, a force, in particular a spring force, acting substantially in the axial direction, is built up and in this way the carrier element 6, due to the resilient properties of the pressure element 8, is pressed in the direction of stator 1, in particular in the direction of the stator core 2. With the contact of the pressure element 8 on the motor housing and with the resilient deformation of the pressure element 8, force is exerted onto the carrier element 6. After the process of mounting the electric motor and consequently after the process of shrinking or pressing the stator 1 with the carrier element 6 into the motor housing, by means of the deformation of the pressure element 8 a prestress is generated which stays the carrier element 6 and prevents any movement of the carrier element 6 or of the receiving element 7 with the connector housing 7b during the operation of the electric motor and therewith of the compressor. The carrier element 6 is herein fixed in position specifically in the axial direction.

During the mounting of the electric motor the connection cables of the conducting wires 9, secured on terminal clamps in the connector housing 7b and curved in the carrier element 6 generate a circular tangential force acting outwardly in the radial direction, which can cause a shifting or turning out of the required position of the carrier element 6 with the receiving element 7 for the connector housing 7b. The connector housing 7b is positioned within the receiving element 7 and therein between the carrier element 6 and the insulation element 4. Since the plug connectors, that are developed as separate components in the form of pins and are also connected across connector ports on the inverter, must be disposed in the required position of the connector housing 7b, and therewith of the receiving element 7, relative to the stator 1 in order for them to engage into the connector ports developed in the connector housing 7b, the carrier element 6 with the receiving element 7 has to be fixed in the required position before mounting the stator 1 in the motor housing in order to prevent the displacement or turning of the connector housing 7b, disposed in the receiving element 7, with respect to the stator 1.

Figure 2:
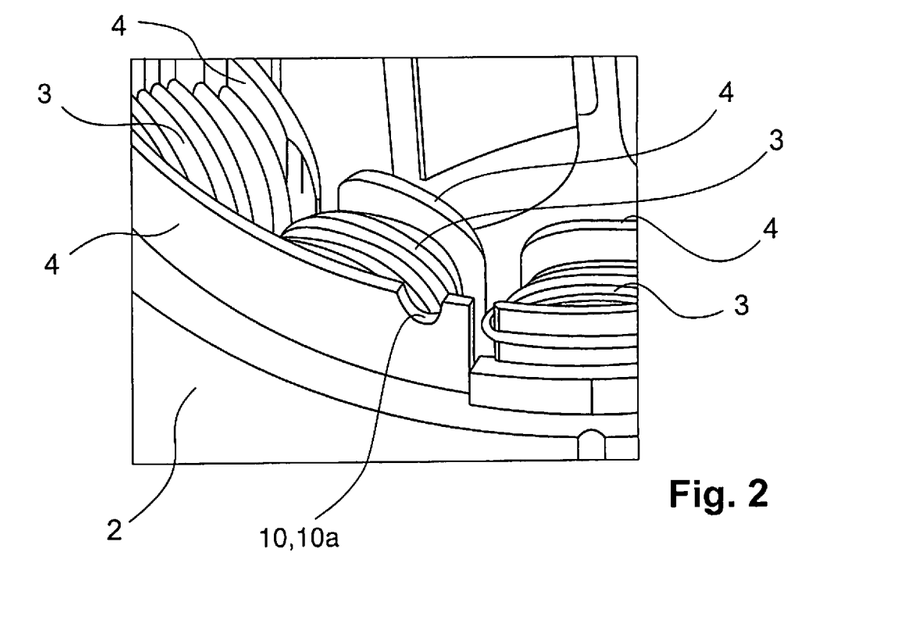
Figure 3:
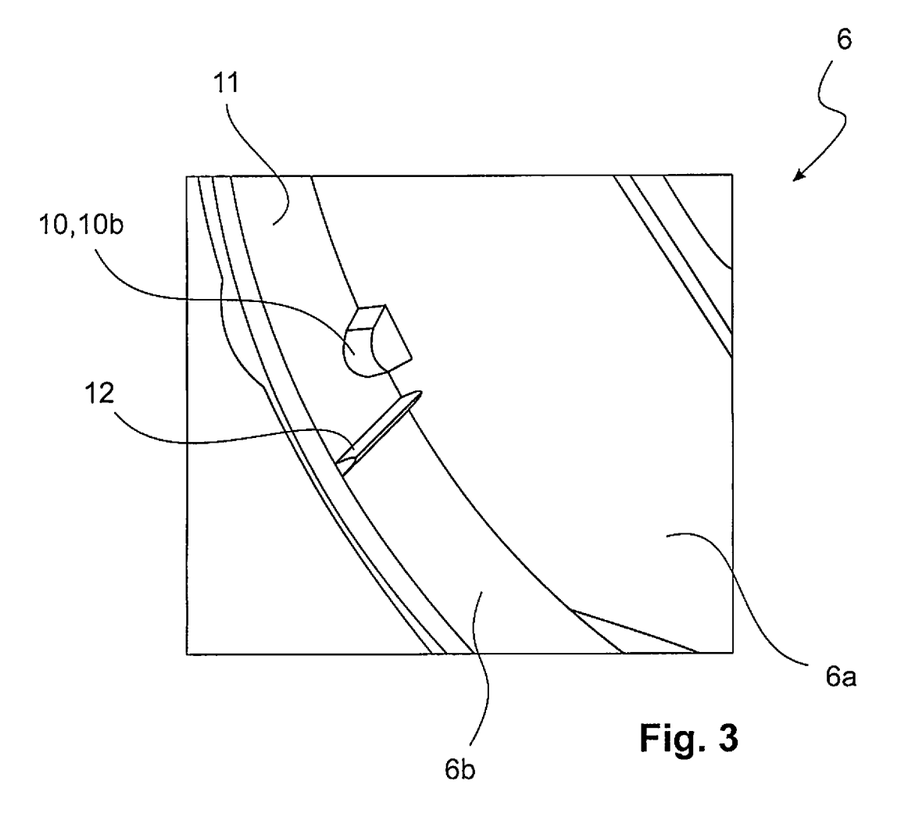
FIG. 3: a detail view of the carrier element with a second element of the system for rotation protection and a projection for securing the carrier element against axial shift relative to the stator.
Figure 4:
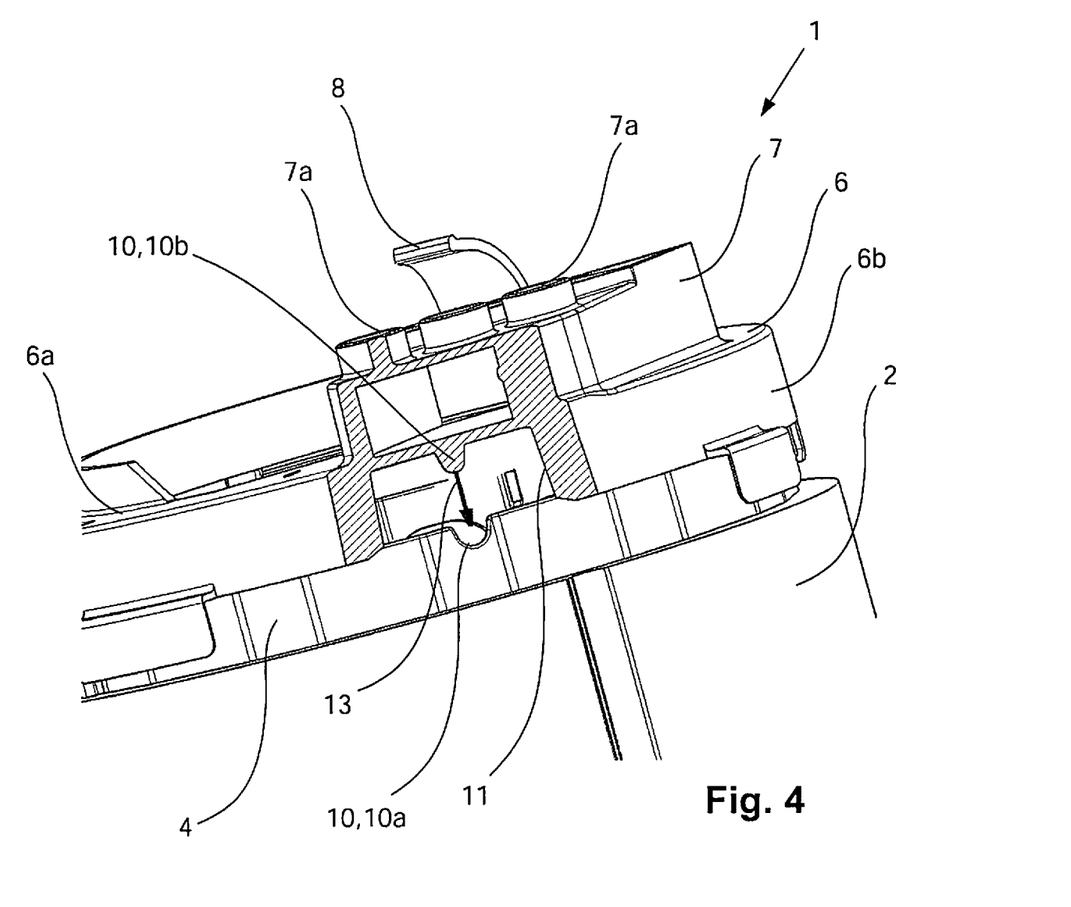
FIG. 4: the stator in a premounted state of the carrier element on the stator core in a sectional representation through the system for rotation protection.

FIG. 2 shows a detail of an end side of stator 1 from FIG. 1B without the carrier element 6, with a first element 10a of a rotation lock system 10 for the rotation protection of the carrier element 6 in the circumferential direction of stator 1, while in FIG. 3 a detail of carrier element 6 is shown with a second element 10b of the rotation lock system 10 for the rotation protection is depicted and with a projection 12, in particular for securing the carrier element 6 against an axial displacement relative to stator 1. In FIG. 4 the stator 1 is shown in a preassembled state of the carrier element 6 on the stator core 2 with a sectional representation through the rotation lock system 10.

According to FIGS. 2 and 4 the insulation element 4 projects on the end side of stator 1 beyond the stator core 2. The region of the insulation element 4 projecting from the stator core 2 comprises substantially a hollow cylindrical wall which is disposed in the axial direction. The outer diameter of the wall of insulation element 4 corresponds herein substantially to the inner diameter of carrier element 6 in the region of the axially oriented hollow cylindrical annular surface 6b plus a tolerance or gap for mounting.

Within the region of the wall of the insulation element 4 that projects from the stator core 2, at least one first element 10a of the rotation lock system 10 is developed in the form of a recess or groove, which, starting from an end side of the wall of the insulation element 4, extends parallel to the longitudinal axis 5 into the wall. The recess 10a is developed as a notch with a semicircular base, which preferably cuts through the wall in the radial direction. The connection edges between the base of the notch and the end side of the insulation element 4 are oriented such that, starting from the end side of the insulation element 4, they minimally taper toward one another.

The rotation lock system 10 for the protection against rotation of carrier element 6, and therewith of the receiving element 7 for the connector housing 7b, in the circumferential direction of stator 1 is based on the formation of the form-closure elements such that for each first element 10a of rotation lock system 10 a second element 10b is provided corresponding in form to the first.

The carrier element 6 according to FIGS. 3 and 4 comprises on an inner side 11 of the axially oriented, hollow cylindrical annular surface 6b at least one second element 10b of system 10 which corresponds to the form of the recess 10a provided on insulation element 4. The second element 10b is herein developed as a formation 10b projecting from the inner side 11 at the transition of the axially oriented annular surface 6b to the radially oriented annular surface 6a. The formation 10b, starting from the transition of the annular surfaces 6a, 6b as a first end, has a shape that tapers in the direction of the longitudinal axis 5 of stator 1, which at a second end, developed distally to the first end, terminates with a semicircular form or a rounded-off edge.

With the sides disposed opposite to one another and tapering toward one another and the semicircular termination as the connection of the side edges, the formation 10b has a geometry and form corresponding to the recess 10a of the system 10. The form closure of elements 10a, 10b of rotation lock system 10 is secured during the mounting of the carrier element 6 on stator core 2 in the direction of motion 13, which extends along the longitudinal axis 5. The second element 10b developed on carrier element 6 engages into the first element 10a developed on insulation element 4.

The recess 10a and formation 10b, each developed symmetrically to the longitudinal axis 5, as elements 10a and 10b of rotation lock system 10, in the mounted state of carrier element 6 on the insulation element are fully in contact on one another with their sides directed toward one another. Due to the connection under form closure formed between the carrier element 6 and the insulation element 4, the carrier element 6 is fixed in position against a rotation about the longitudinal axis 5 and is fixed in position in the radial direction on the insulation element and always oriented in the desired manner toward the stator 1 in order to engage during the mounting of the electric motor the plug connectors, disposed on the inverter and developed as pins, into the connector ports implemented in the connector housing 7b.

In an implementation with at least two first elements 10a and two second elements 10b of the rotation lock system 10 for the protection against rotation of carrier element 6 in the circumferential direction of stator 1, the elements 10a, 10b corresponding to one another are asymmetric, stated differently they are disposed at an unequal spacing from the circumference or angle with respect to one another in order to ensure the unambiguous and unique disposition of the carrier element 6 with the receiving element 7 and therewith of the connector housing 7b.

According to FIG. 3 the carrier element 6 comprises on the inner side 11 of the axially oriented hollow cylindrical annular surface 6b, apart from the second element 10b of system 10, at least one projection 12 in the form of a fin, which is disposed extending in the direction of the longitudinal axis 5 and formed having a constant cross sectional area. In the mounted state of the carrier element 6 on the stator core 2 or on the insulation element 4, the upper side, oriented toward the insulation element 4, of the fin is in contact on the outside of the wall projecting from the stator core 2, of the insulation element 4. By means of the projection 12 between the wall of the insulation element 4 and the carrier element 6 a press fit or a press seat is generated which prevents the undesirable movement of the carrier element 6 in the axial and radial direction with respect to the insulation element 4.

With the implementation of at least two projections 12, the projections 12 are distributed uniformly on the circumference of the hollow cylindrical annular surface 6b or they are disposed at equal angles to each other in order to center the carrier element 6 on the insulation element 4. The concentric position of the carrier element 6 on the insulation element 4 is attained, for example with the implementation of three fin-shaped projections 12 which are oriented at an angle of 120° to each other.

LIST OF REFERENCE SYMBOLS

1 Stator
2 Stator core
3 Coil
4 Insulation element
5 Longitudinal axis
6 Carrier element
6a Radial annular surface
6b Axial annular surface
7 Receiving element
7a Connection passage
7b Connector housing
8 Pressure element
9 Conducting wire
10 Rotation lock system
10a First element, recess system 10
10b Second element, formation system 19

11 Inner side axial annular surface 6b carrier element 6
12 Projection
13 Direction of motion
A Drive shaft
E Electric motor
G Housing
L Printed circuit board
R Rotor
SE Switching element
VM Connection arrangement
VM Compression mechanism

What is claimed:

1. A device for driving a compressor of a gaseous fluid comprising a rotor and a stator, which are disposed extending along a common longitudinal axis, wherein on a first end side, oriented in the axial direction of the stator, a carrier element is in contact which
is developed with at least one receiving element for a connector housing having at least one plug connector as a coherent unit and integral component,
is disposed with a cylindrical wall in contact in the axial direction on an insulation element fixedly connected with the stator, and
comprises an axially oriented annular surface and a radially oriented annular surface,
wherein a rotation lock system for the protection against rotating out of position of the carrier element in a circumferential direction of the stator is developed with at least one first element and at least one second element which together form a connection under form closure,
wherein the second element of the rotation lock system is implemented on an inner side of the axially oriented annular surface of carrier element, and
wherein the second element is developed as a formation projecting from the inner side at the transition of the axially oriented annular surface to the radially oriented annular surface.

2. A device according to claim 1, wherein the at least one receiving element is developed with at least one connection passage which corresponds to a connector port of the connector housing for receiving plug connectors.

3. A device according to claim 1, wherein the insulation element is disposed in contact in a radial direction inside on an outer wall of a stator core and the wall is developed as a region projecting in the axial direction from the stator core.

4. A device according to claim 1, wherein the radially oriented annular surface and the axially oriented annular surface adjoin one another at outer side edges and are connected with one another.

5. A device according to claim 4, wherein the radially oriented annular surface of the carrier element has the form of a circular ring.

6. A device according to claim 1, wherein the axially oriented annular surface of the carrier element has the form of a cylinder.

7. A device according to claim 1, wherein the first element and the second element are of a form symmetrical to the longitudinal axis.

8. A device according to claim 1, wherein the first element of the rotation lock system is implemented on the insulation element and the second element of the rotation lock system is implemented on the carrier element.

9. A device according to claim 8, wherein the first element of the rotation lock system is developed as a recess which, starting from an end side of the wall of the insulation element, extends parallel to the longitudinal axis of the stator into the wall of the insulation element.

10. A device according to claim 9, wherein the first element of rotation lock system is developed as a notch with a semicircular base and connection edges, wherein the connection edges, extending between the base of the notch and the end side of the wall of the insulation element, are oriented such that they taper toward one another, starting from the end side of the wall of the insulation element.

11. A device according to claim 1, wherein the second element of the rotation lock system is developed as a formation which corresponds to the form of the first element of system.

12. A device according to claim 11, wherein the second element of rotation lock system is developed as a formation from an inner side of the axially oriented annular surface of the carrier element with a form tapering in the direction of the longitudinal axis of the stator and has a semicircular form at the tapered end.

13. A device according to claim 1, comprising at least two of the first elements and two of the second elements.

14. A device according to claim 1, wherein on an inner side of the axially oriented annular surface of the carrier element at least one projection is developed in the form of a fin.

15. A device according to claim 14, wherein the fin is disposed extending in the direction of the longitudinal axis.

16. A device according to claim 14, wherein an upper side of the projection oriented toward the insulation element is disposed in contact on an outer side of the wall of the insulation element.

17. A device according to claim 14, wherein with the formation of at least two of the at least one projection, wherein the two projections are disposed distributed uniformly over the circumference of the axially oriented annular surface of the carrier element.

18. A method for driving a compressor wherein a gaseous fluid is compressed, wherein the compressor is driven with a device according to claim 1, wherein the compressor is operatively connected to a motor vehicle climate control system.

* * * * *